No. 682,648.  
H. SPLITDORF.  
DRY BATTERY.  
(Application filed May 27, 1901.)  
Patented Sept. 17, 1901.

(No Model.)

Witnesses:  
John Becker.  
William Schulz.

Inventor:  
Henry Splitdorf  
by his attorneys  
Roeder & Briesen

THE NORRIS PETERS CO., PHOTO-LITHO., WASHINGTON, D. C.

UNITED STATES PATENT OFFICE.

HENRY SPLITDORF, OF NEW YORK, N. Y.

DRY BATTERY.

SPECIFICATION forming part of Letters Patent No. 682,648, dated September 17, 1901.

Application filed May 27, 1901. Serial No. 62,022. (No model.)

*To all whom it may concern:*

Be it known that I, HENRY SPLITDORF, a citizen of the United States, and a resident of New York city, county and State of New York, have invented certain new and useful Improvements in Dry Batteries, of which the following is a specification.

This invention relates to a dry battery which is so constructed that the shell inclosing the battery is effectively protected against the action of the electrolytic fluid, though the latter has access to the outer surface as well as to the inner surface of the zinc element.

Figure 1:
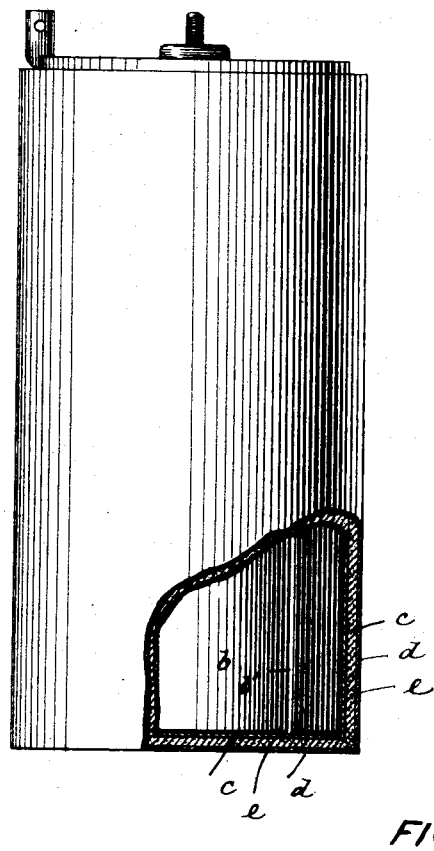
Figure 2:
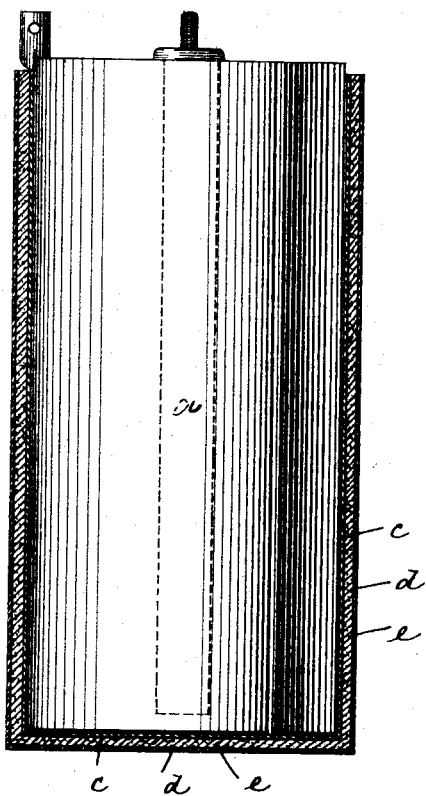
Figure 3:
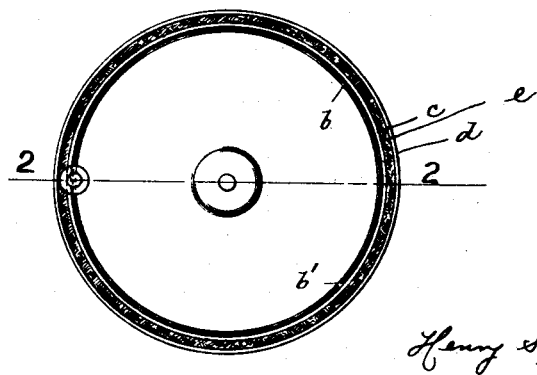

In the accompanying drawings, Figure 1 is a side elevation, partly cut away, of my improved dry battery. Fig. 2 is a vertical longitudinal section thereof on line 2 2, Fig. 3; and Fig. 3, a plan of the battery.

The letter $a$ represents the carbon element, and $b$ is the zinc element, of a dry battery of the usual or suitable construction. The zinc element is surrounded at its side and at its bottom by two concentric paper shells $c$ and $d$, between which is inclosed a packing $e$ of such a nature that it will withstand the destructive action of the electrolytic fluid. I use for such a packing a mixture of paraffin and rosin, which I have found to give superior results.

The zinc electrode $b$ is slitted lengthwise, as at $b'$, and is open at the bottom, so that the electrolytic fluid may attack the outer as well as the inner surface of the electrode and correspondingly increase the life of the battery. Owing to the protective coating surrounding the element $b$, the electrolytic fluid will not be able to reach the outermost shell $d$, so that the casing will always remain dry and intact.

It will be seen that by my invention I may reduce the thickness of the element $b$, that I prolong the life of the battery, and that any destruction of the inclosing shell is prevented.

What I claim is—

A dry battery provided with a negative element, a zinc element, two concentric shells surrounding the zinc element, and a packing of paraffin and rosin between the shells, substantially as specified.

Signed by me at New York city, county and State of New York, this 25th day of May, 1901.

HENRY SPLITDORF.

Witnesses:
WILLIAM SCHULZ,
F. V. BRIESEN.